(12) United States Patent
Tanaka (10) Patent No.: US 9,628,142 B2
(45) Date of Patent: Apr. 18, 2017

(54) OPTICAL TRANSMITTER

(71) Applicant: SUMITOMO ELECTRIC INDUSTRIES, LTD., Osaka (JP)

(72) Inventor: Hiromi Tanaka, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/861,944

(22) Filed: Sep. 22, 2015

(65) Prior Publication Data

US 2016/0087676 A1     Mar. 24, 2016

(30) Foreign Application Priority Data

Sep. 24, 2014  (JP) ................. 2014-193522

(51) Int. Cl.
 *H04B 3/32*      (2006.01)
 *H04B 10/50*     (2013.01)

(52) U.S. Cl.
 CPC ............. *H04B 3/32* (2013.01); *H04B 10/502* (2013.01); *H04B 10/503* (2013.01)

(58) Field of Classification Search
 CPC ...... H04B 3/32; H04B 10/502; H04B 10/503; H04B 10/564; H04B 10/07957; H04B 10/07955; H04B 10/0799; H04B 10/506; H04B 10/572; H04B 10/588; H04B 10/66; H04B 10/58; H04B 10/50; H04B 10/40; H04B 10/6911; H04B 10/504
 USPC ............... 398/162, 187, 209, 213, 192, 193, 398/195–198, 137
 See application file for complete search history.

(56) References Cited

U.S. PATENT DOCUMENTS

| | | | | |
|---|---|---|---|---|
| 5,509,023 A | * | 4/1996 | Glance | H01S 3/1062 372/20 |
| 6,975,813 B1 | * | 12/2005 | Inoue | H01S 5/0683 372/29.014 |
| 7,184,671 B2 | * | 2/2007 | Wang | H04B 10/572 398/195 |
| 7,352,786 B2 | * | 4/2008 | Ikeda | H01S 5/0427 372/38.01 |
| 7,696,467 B2 | * | 4/2010 | Takiba | H01L 27/1446 250/214 A |

(Continued)

FOREIGN PATENT DOCUMENTS

JP    2011-239364    11/2011

*Primary Examiner* — Hibret Woldekidan
(74) *Attorney, Agent, or Firm* — Smith, Gambrell & Russell, LLP.

(57) ABSTRACT

An optical transmitter includes four LDs, four LDDs that drive the LDs, four monitoring PDs that convert some of optical signals emitted from the LDs to electrical sisals and output them, a controller that controls the LDDs in response to the electrical monitoring signals generated by the monitoring PDs, and a switch that receives the electrical monitoring signals though signal lines from the monitoring PDs and electrically connects only a selected signal line selected by the controller to the controller. The controller outputs a selection signal that selects the selected signal line from the signal lines in order to the switch, and controls the LDDs so that an optical power of the LD corresponding to the PD approaches a predetermined value, according to the electrical monitoring signal outputted from the PD corresponding to the selected signal line.

6 Claims, 5 Drawing Sheets

(56) References Cited

U.S. PATENT DOCUMENTS

| | | | | |
|---|---|---|---|---|
| 7,899,098 B2* | 3/2011 | Robinson | ............ | H01S 5/06808 |
| | | | | 372/38.01 |
| 9,525,480 B2* | 12/2016 | Yuda | .................... | H04B 10/502 |
| 2002/0118424 A1* | 8/2002 | Miki | ....................... | H01S 5/068 |
| | | | | 398/192 |
| 2005/0058460 A1* | 3/2005 | Wang | ................... | H04B 10/572 |
| | | | | 398/195 |
| 2008/0025732 A1* | 1/2008 | Hattori | ................... | H04B 10/85 |
| | | | | 398/194 |
| 2009/0224144 A1* | 9/2009 | Yoshida | ............. | H04B 10/0731 |
| | | | | 250/216 |
| 2010/0128748 A1* | 5/2010 | Robinson | ............ | H01S 5/06808 |
| | | | | 372/38.02 |

* cited by examiner

OPTICAL TRANSMITTER

TECHNICAL FIELD

The present invention relates to an optical transmitter.

BACKGROUND

In an optical transmitter, a laser diode driver (LDD: Laser Diode Driver) that drives a laser diode (LD) is controlled, so that optical power of an optical signal output from the LD is maintained at a fixed value. Specifically, a method of providing a photo detector (PD: Photo Diode) for monitoring optical power emitted from the LD and controlling the LDD in response to an electrical monitoring signals output by the PD is known, (for example, see Japanese Patent Application Laid-Open No. 2011-239364).

Here, for example, 100 GbE CFP (100 Gigabit Ether C Form-factor Pluggable) optical transceivers have been introducing a configuration that a plurality of PDs is provided corresponding to a plurality of LDs and the electrical monitoring signals output from the respective PDs are received by ADCs (Analog Digital Converter) built in a controller. Such a configuration has a risk that the electrical monitoring signals output from the plurality of PDs interfere with each other (cause crosstalk). In this case, some noise occurred in the electrical monitoring signals prevents the LDD from being normally controlled, so that the optical power of the LD cannot be maintained at an appropriate value.

It can be considered to evaluate an effect of the crosstalk among the electrical signals beforehand and control the LDD by cancelling the effect of the crosstalk in practice. However such prior measurement needs to be performed for multiple patterns, so that processes of the evaluation and cancellation are complicated. For example, setting each of four LDs to ON (emission) or OFF (extraction) causes a combination of eight cases each to be handled differently.

SUMMARY

An optical transmitter relating to an embodiment of the present invention comprises, at least two laser diodes (LDs), driving circuits, photo detectors (PDs), a switch, and a controller. The at least two laser diodes (LDs) are configured to generate respective optical signals in response to respective driving signals. The driving circuits are configured to generate the respective driving signals. The photo detectors (PDs) are configured to convert the respective optical signals to respective first electrical signals and output, the respective first electrical signals. The switch is configured to select one of the respective first electrical signals according to a selection signal, and configured to output the one of the respective first electrical signals as a second electrical signal. The controller is configured to generate the selection signal and control one of the driving circuits in response to the second electrical signal so as to maintain intensity of one of the respective optical signals at a predetermined value. The one of the respective optical signals being generated by one of the at least two LDs that is driven by the one of the driving circuit.

DETAILED DESCRIPTION

Details of Embodiment of Claimed Invention

A specific example of the optical transmitter according to the embodiment of the present invention will be described with reference to the drawings hereinafter. The present invention is not limited to these samples and is indicated by the scope of claims, and it is intended to include all modifications within the meanings and scope that are equivalent to the scope of claims.

Figure 1:
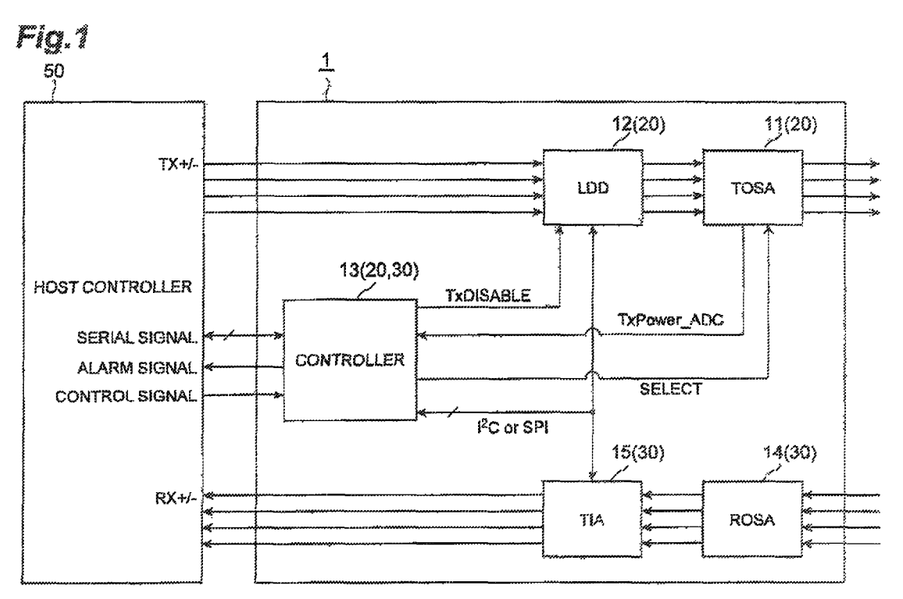
FIG. 1 is a block diagram of an optical transceiver relating to an embodiment of the present invention.

FIG. 1 is a block diagram of an optical transceiver relating to an embodiment of the present invention. An optical transceiver 1 is a 100 Gigabit optical transceiver that transmits and receives optical signals having four wavelengths of 1300 nm band using a two-core bidirectional, optical fiber cable, for example. The optical transceiver 1 works as a module that is hot-swappable to an external device (upper layer). A standard related to an external shape, terminal arrangement, electrical characteristics, and optical characteristics of such an optical transceiver is defined by respective MESA (Multi-Source Agreement) groups of QSFP+ (Quad Small Form Factor Pluggable), CAP (100G Form-factor Pluggable), CFP2, CFP4 or the like. In the present embodiment, the optical transceiver 1 is described as the 100-gigabit optical transceiver, however, the optical transceiver 1 may be a 40-gigabit optical transceiver.

The optical transceiver 1 includes a TOSA (Transmitter Optical Sub Assembly) 11, an LDD12 (drive circuit), a controller 13 (controller), a ROSA (Receiver Optical Sub-Assembly) 14, and a TIA (Trans-Impedance Amplifier) 15. The TOSA 11, the LDD 12, and the controller 13 constitute an optical transmission unit 20 (optical transmitter) of the optical transceiver 1. Also, the ROSA 14, the TIA 15, and the controller 13 constitutes an, optical reception unit 30 of the optical transceiver 1.

The TOSA 11 converts four 25 Gbps electrical signals to four optical signals each having a different wavelength from the others and outputs the four optical signals. All four wavelengths of the optical signals may be equal, when the four signals are transmitted in parallel as illustrated in FIG. 1. The mutually different wavelengths (the respective wavelengths in this case are also defined by the MSA or the like) may be used, when the four optical signals are combined into one multiplex optical signal through an optical multiplexer (not shown in the figure) and then transmitted to one of the two cores. The electrical signals (driving signals) to drive respective LDs in the TOSA 11 are generated by the LDD 12 in response to electrical signals TX+/− inputted from a host controller 50 to the optical transceiver 1 compliant with the CFP4 MSA, for example. Or, in the case of the CFP transceiver, ten electrical signals each having a transmission rate of 10 Gbps are inputted from the host controller 50 to the optical transceiver 1. A signal processing IC (not shown in the figure) converts the ten electrical signals to four electrical signals each, having a transmission rate of 25 Gbps. The LDD 12 receives the four electrical signals. The TOSA 11 is an integrated TOSA incorporating four LDs 21 (see FIG. 2. details will be described later), and the four optical signals are output by the four LDs 21, respectively.

The LDD 12 outputs driving signals for modulating output light emitted from the LD 21 (see FIG. 2) in response to the electrical signals TX+/− according to LD driver circuit. The disable signals inputted from the controller 13 to the LDD 12 disable the LDD 12 for outputting the driving signals. The LDD 12 is a 4 ch Driver IC incorporating four driving circuits that drive the four LDs 21 (see FIG. 2) in parallel. The number of the driving circuits is equal with the number of the LDs 21. The respective driving signals output from the LDD 12 are inputted to the respective LDs 21 (details will be described later).

The controller 13 communicates with the host controller 50 outside the optical transceiver 1, and also controls the respective elements (the TOSA 11, the LDD 12, the ROSA 14, and the TIA 15) inside the optical transceiver 1 according to commands from the host controller. The controller 13 transmits and receives data for controlling and monitoring the optical transceiver 1 to and from the host controller 50 via a serial data, communication. By transmitting the transmission disable signal (TxDISABLE) for an arbitrary channel of the four driving circuits to the LDD 12, the controller 13 shuts-off the optical signal of the LD 21 specified by the channel. Also, the controller 13 has a function of controlling the LDD 12 according to the optical power (intensity) output from the LD 21 inside the TOSA 11 (details will be described later). Further, detection of a failure inside the optical transceiver 1 allows the controller 13 to transmit alarm signals to the host controller 50, and to control the respective elements inside the optical transceiver 1 on the basis of control signals (commands) from the host controller 50.

Figure 3:
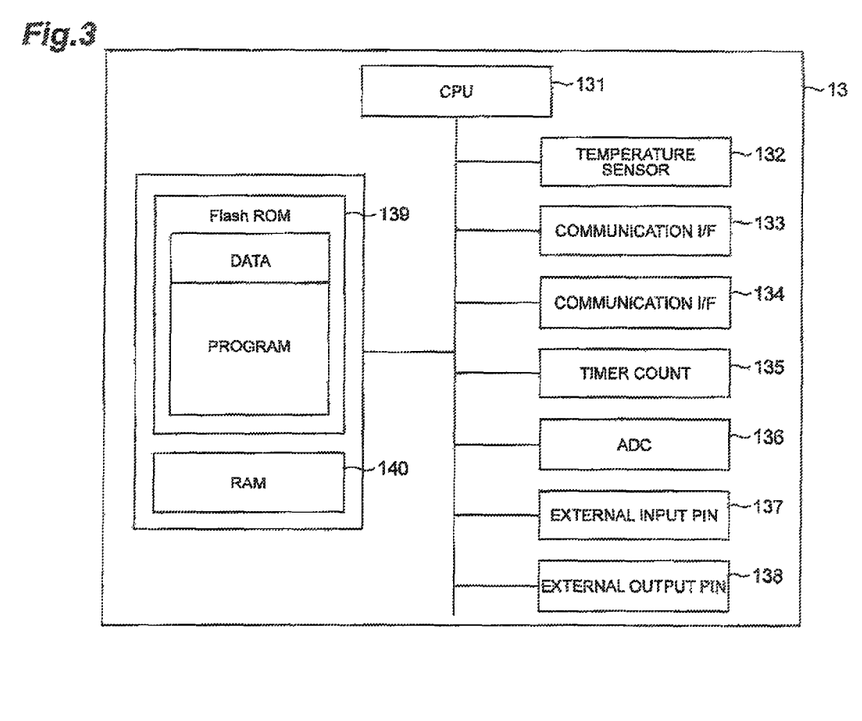
FIG. 3 is a block diagram of a controller illustrated in FIG. 2.

The controller 13 is a so-called one-chip microcomputer, an FPGA (field-programmable gate array), a CPLD (Complex Programmable Logic Device) or the like. Also, the controller 13 may be a combination of the plurality of these circuits. FIG. 3 is a block diagram illustrating a hardware configuration of the controller 13. The controller 13 includes a CPU 131 that controls respective blocks of the controller 13, a temperature sensor 132, a communication interface 133 with the host controller 50, a communication interface 134 with the respective elements (individual ICs) inside the optical transceiver 1, a timer count 135, ADCs (analog-to-digital converters) 136 that receive analog signals (electrical signals) from the inside of the TOSA 11 and converts them to digital signals, external input pins 137 to receive the control signals from the host controller 50 external output pins 138 to output signals to the host controller 50 and the respective elements inside the optical transceiver 1, a flash ROM (Read Only Memory) 139, and a RAM (Earldom Access Memory) 140. The communication interfaces 133 and 134 may be, for example, I2C (Inter-Integrated Circuit), MDIO (Management Data Input/Output), SPI (Serial Peripheral Interface) or the like.

Returning to FIG. 1, the ROSA 14 converts the four 25 Gbps optical signals to the four electrical signals respectively and outputs the four electrical signals. The TIA receives the four 25 Gbps electrical signals output by the ROSA 14 and then outputs them to a CDR (not shown in the figure), and clock data recovery is carried out. In the case of the CFP4 transceiver, the four 25 Gbps electrical signals outputted from the CDR are transmitted to the host controller 50. Or, in the case of the CFP transceiver, the signal processing IC (not shown in the figure) further converts the four 25 Gbps electrical signals to ten electrical signals each having a transmission rate of 10 Gbps and outputs the ten electric signals to the host controller 50.

The TIA 15 is the IC that transforms current signals output from the ROSA 14 into voltage signals depending on a predetermined gain (transimpedance gain).

Figure 2:
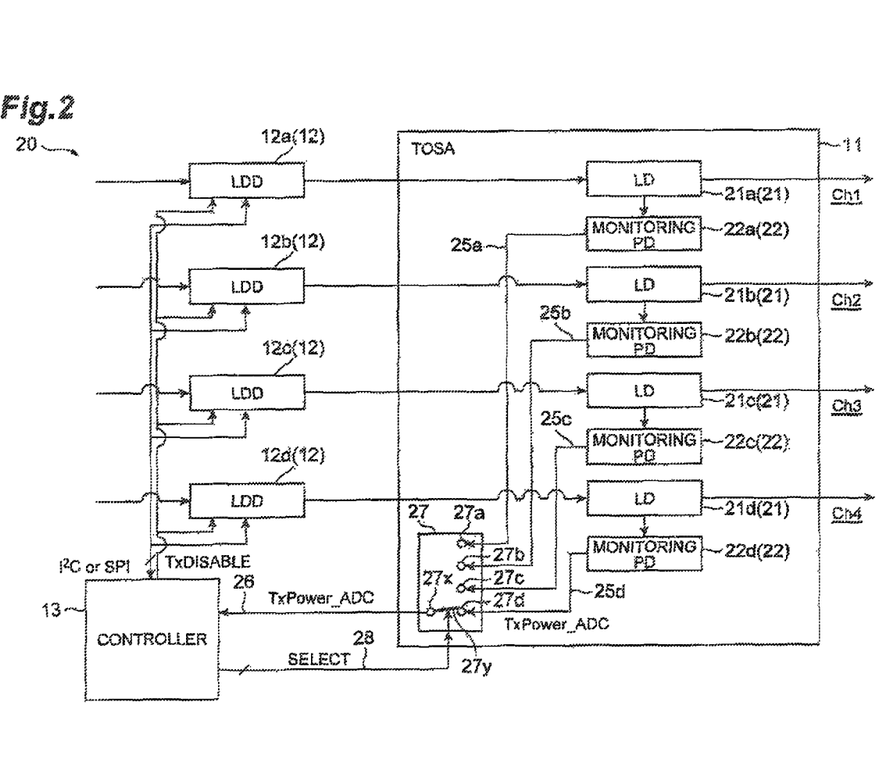
FIG. 2 is a block diagram of an optical transmission unit (optical transmitter) of the optical transceiver illustrated in FIG. 1.

Next, with reference to FIG. 2, monitoring of the output power (intensity) of the optical signals output by the LD 21 and control of the LDD 12 based on a monitoring result, will be described in detail. FIG. 2 is a block diagram of the optical transmission unit 20 of the optical transceiver 1 illustrated in FIG. 1.

As illustrated in FIG. 2, the optical transmission unit 20 includes four LDs 21 (LDs 21a-21d), four LDDs 12 (LDDs 12a-12d), the same number (four) of PDs for monitoring 22 (monitoring PDs 22a-22d) as the LDs 21, a controller 13, and a switch unit 27. The four LDDs 12 (LDDs 12a-12d) are provided corresponding to the LDs 21a-provided corresponding to the LDs 21a-21d to convert the respective optical signals output from the LDs 21a-21d to the electrical signals and output them. The controller 13 controls the LDDs 12 according to the electrical signals output by the monitoring PDs 22. The switch unit 27 is electrically connected to signal lines 25a-25d to receive the respective monitoring electrical signals generated by the monitoring PDs 22a-22d and also electrically connected to a signal line 26 to output a selected monitoring signal to the controller 13. In the present embodiment, the TOSA 11 includes the four LDs 21, the four monitoring PDs 22, and the switch unit 27. Also, the four LDDs 12 and the controller 13 are arranged outside the TOSA 11. In such a configuration, the signal lines 25a-25d are wired inside a package of one component (the TOSA 11), and the signal line 26 is wired between two components (the TOSA 11 and the controller 13). Therefore, the length of each of the signal lines 25a-25d can be made shorter than the length of the signal line 26 independent of arrangement of the two components or the like.

That is, the monitoring PDs 22a-22d include output terminals (second output terminals) to output the electrical monitoring signals toward the switch unit 27. Also, the switch unit 27 includes input terminals 27a-27d (first input terminals, details will be described later) to receive the electrical monitoring signals from the monitoring PDs 22a-22d, and an output terminal 27x (first output terminal, details will be described later) to output a selected electrical signal towards the controller 13. Also, the controller 13 includes an input terminal (second input terminal) to receive the selected electrical signal from the switch unit 27. In the configuration, the length of each of the signal lines 25a-25d (first electrical wiring) that electrically connects the second output terminals and the first input terminals one on one is shorter than the length of the signal line 26 (second electrical wiring) that electrically connects the first output terminal and the second input terminal.

The switch unit 27 is a 4-to-1 type analog switch, and includes the input terminals 27a-27d (first input terminals) and the output side terminal 27x (first output terminal). The number of the input terminals 27a-27d (first input terminals) is equal to the number (four) of the LDs 21, so that each of the input terminals 27a-27d is electrically connected to each of the signal lines 25a25d, respectively. The output terminal 27x (first output terminal) is electrically connected to the signal line 26. Also, the switch unit 27 includes a connection unit 27y that electrically connects one of the input terminals 27a-27d with the output terminal 27x. The connection unit 27y selects only one signal line from the signal lines 25a-25d according to the selection signal provided from the controller 13 and connects the selected signal line to the output side terminal 27x. Therefore, the controller 13 determines which input terminal should be selected and provides the selection signal to the switch unit 27. That is, the output terminal 27x is electrically connected to only one of the input terminals 27a-27d selected by the selection signal.

The optical signal emitted from the LD 21a is branched through a splitter (not shown in the figure) for example, and a branched part is fed to the monitoring PD 22a. The branched part is just a small portion of the optical signal emitted from the LD 21a, and a large part of the optical signal emitted from the LD 21a is output to the outside of the TOSA 11 without being fed to the monitoring PD 22a. The input terminal 27a of the switch unit 27 receives the electrical monitoring signal (TxPower_ADC) for Ch1 from the monitoring PD 22a through the signal line 25a. Similarly, the optical signal emitted from the LD 21b is branched through the splitter (not shown in the figure) for example, and a branched part is fed to the monitoring PD 22b. The input terminal 27b of the switch unit 27 receives the electrical monitoring signal (TxPower_ADC) for Ch2 from the monitoring PD 22b through the signal line 25b. Similarly, the optical signal emitted from the LD 21c is branched through the splitter (not shown in the figure) for example, and a branched part is fed to the monitoring PD 22c. The input side terminal 27c of the switch unit 27 receives the electrical monitoring signal (TxPower_ADC) for Ch3 from the monitoring PD 22c through the signal line 25c. Similarly, the optical signal emitted from the LD 21d is branched through the splitter (not shown in the figure) for example, and a branched part is fed to the monitoring PD 22d. The input terminal 27d of the switch unit 27 receives the electrical monitoring signal (TxPower_ADC) for Ch4 from the monitoring PD 22d through the signal line 25d.

When the connection unit 27y electrically connects the input terminal 27a to the output terminal 27x, the electrical monitoring signal for Ch1 is transmitted to an ADC 136 (see FIG. 3) of the controller 13 through the input terminal 27a, the connection unit 27y, the output terminal 27x, and the signal line 26. Similarly, when the connection unit 27y electrically connects the input terminal 27b to the output side terminal 27x, the electrical monitoring signal for Ch2 is transmitted to the ADC 136 (see FIG. 3) of the controller 13 through the input terminal 27b, the connection unit 27y, the output terminal 27x, and the signal line 26. Similarly, when the connection unit 27y electrically connects the Input side terminal 27c to the output side terminal 27x, the electrical signal for Ch3 is transmitted to the ADC 136 (see FIG. 3) of the controller 13 through the input terminal 27c, the connection unit 27y, the output terminal 27x, and the signal line 26. Similarly, when the connection unit 27y electrically connects the input terminal 27d to the output terminal 27x, the electrical monitoring signal for Ch4 is transmitted to the ADC 136 (see FIG. 3) of the controller 13 through the input terminal 27d, the connection unit 27y, the output terminal 27x, and the signal line 26.

The controller 13 controls die switch, unit 27 by providing the selection signal to the switch unit 27, and selects the electrical monitoring signals one after another at a predetermined time interval. That is, the controller 13 selects one of the signal lines to electrically connect the selected signal line to the output terminal 27x through the connection unit 27y in order one by one. Here, the controller 13 and the switch unit 27 are electrically connected by two select signal lines 28 to transmit two binary digits as the selection signal.

The controller 13 outputs a selection signal that specifies one of the input terminals 27a-27d by two binary digits to the switch unit 27 through the two select signal lines 28. For example, when both of the two binary digits received from the controller 13 through the two select signal lines 28 are at a Low level (namely, the controller 13 sets select signal logic to Ch1), the switch unit 27 determines the signal line 25a to be selected, and connects the connection unit 27y to the input terminal 27a. Also, for example, when the upper digit of the two binary digits received through one of the select signal lines 28 is at the Low level and the lower digit of the two binary digits received though the other of the select signal lines 28 is at a High level (namely, the controller 13 sets the select signal logic to Ch2), the switch unit 27 determines the signal line 25b to be selected and connects the connection unit 27y to the input terminal 27b. Also, for example, when the upper digit is at the High level and the lower digit is at the Low level (namely, the controller 13 sets the select signal logic to Ch3), the switch unit 27 determines the signal line 25c to be selected and connects the connection unit 27y to the input terminal 27c. Also, for example, when both of the two binary digits are at the High level (namely, the controller 13 sets the select signal logic to Ch4), the switch unit 27 determines the signal line 25d to be selected and connects the connection unit 27y to the input side terminal 27d. The controller may repeat these switching of the signal lines 25a to 25d at a predetermined time interval.

Also, the controller 13 controls die LDD 12 so as to maintain the optical power (intensity) of one of the LDs 21 corresponding to the selected electrical monitoring signal (that is, the selected monitoring PD) to a predetermined value, according to the electrical monitoring signal (TxPower_ADC) selected by the selection signal. Specifically, the controller 13 receives one of the electrical monitoring signals (TxPower_ADC) from the output terminal 27x at a time corresponding to the selection signal and fetches it to the ADC 136 (see FIG. 3). The electrical signal fetched by the ADC 136 is a voltage signal converted from the current signal generated from the PD 22 by using a resistor or the like. The ADC 136 converts the voltage signal to a digital value. The controller 13 controls the LDD 12 so that the optical power of the LD 21 approaches the predetermined value based on the digital value converted by the ADC 136. Specifically, the controller 13 adjusts bias and modulation currents of the LD 21 by controlling the LDD 12, and makes the optical power of the LD 21 approach the predetermined value.

Figure 4:
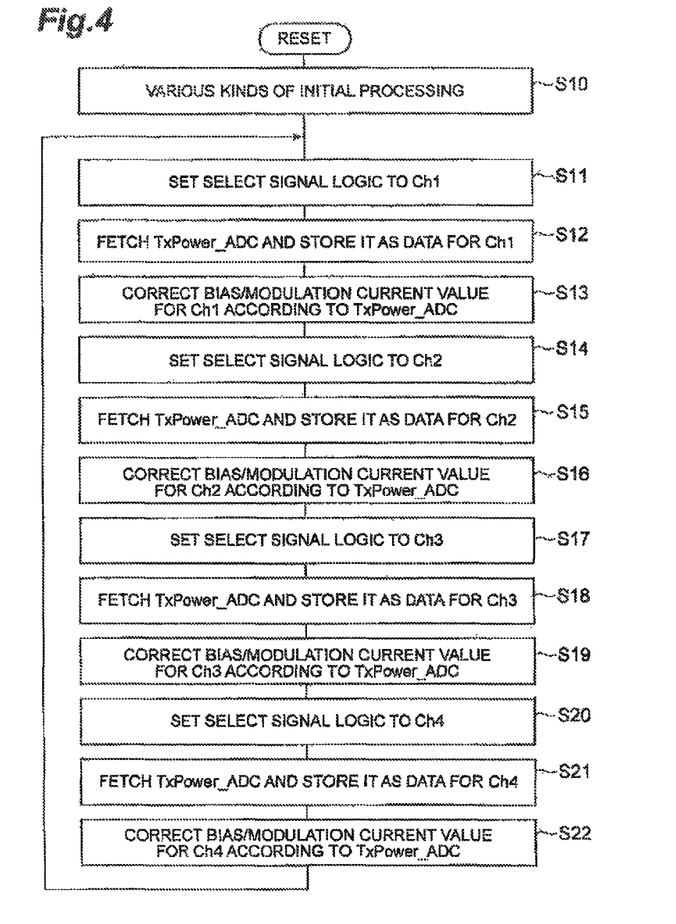
FIG. 4 is a flowchart illustrating control processing of the controller in the optical transmission unit illustrated in FIG. 2.

Next, with reference to FIG. 4, control processing of the controller 13 will be described. FIG. 4 is a flowchart illustrating the control processing of the controller 13 in the optical transmission unit 20 illustrated in FIG. 2.

As illustrated in FIG. 4, when the optical transceiver 1 is activated by power on or reset by a reset signal, in the controller 13, various kinds of initial processing are performed (S10). After the processing, the controller 13 controls communication with the host controller 50, and with the respective elements inside the optical transceiver 1.

When the processing in S10 is completed, the controller 13 selects the signal line to be selected from the plurality of signal lines in order. The controller 13 first sets both of the two binary digits to the Low level to specify Ch1 (S11) for the automatic power control (APC). In this case, the input terminal 27a and the output terminal 27x are electrically connected by the connection unit 27y, and the electrical monitoring signal (TxPower_ADC) for Ch1 provided by the monitoring PD 22a is fetched to the ADC 136 (see FIG. 3)

of the controller 13 and the digital data converted from the monitoring signal by the ADC 136 is stored in the RAM 140 (see FIG. 3) as data for Ch1 (S12). Then, the controller 13 corrects the bias and modulation currents of the LD 21a so that the optical power of the LD 21a approaches the predetermined value according to the selected electrical monitoring signal (TxPower_ADC) (S13).

The processing in S11-S13 described above is performed also to the remaining channels (Ch2-4). That is, after S13, the controller 13 sets the upper digit of the two binary digits at the Low level and the lower digit of the two binary digits at the High level and thus sets the select signal logic to Ch2 (S14). In this case, the input terminal 27b and the output side terminal 27x are electrically connected by the connection unit 27y, and the electrical monitoring signal (TxPower_ADC) for Ch2 provided by the monitoring PD 22b is fetched to the ADC 136 (see FIG. 3) of the controller 13 and the digital data converted from the selected monitoring signal by the ADC 136 is stored in the RAM 140 (see FIG. 3) as data for Ch2 (S15). Then, the controller 13 corrects the bias and modulation currents of the LD 21b so that the optical power of the LD 21b of Ch2 approaches the predetermined value according to the selected electrical signal (TxPower_ADC) (S16). Further, after S16, the controller 13 sets the upper digit of the two binary digits at the High level and the lower digit of the two binary digits at the Low level and thus sets the select signal logic to Ch3 (S17). In this case, the input terminal 27c and the output terminal 27x are electrically connected by the connection unit 27y, and the electrical monitoring signal (TxPower_ADC) for Ch3 provided by the monitoring PD 22c is fetched to the ADC 136 (see FIG. 3) of the controller 13 and the digital data converted from the selected monitoring signal by the ADC 136 is stored in the RAM 140 (see FIG. 3) as data for Ch3 (S18). Then, the controller 13 corrects the bias and modulation currents of the LD 21c so that the optical power of the LD 21c of Ch3 approaches the predetermined value according to the selected electrical signal (TxPower_ADC) (S19). Further, after S19, the controller 13 sets both of the two binary digits at the High level and thus sets the select signal logic to Ch4 (S20). In this case, the input side terminal 27d and the output side terminal 27x are electrically connected by the connection unit 27y, and the electrical monitoring signal (TxPower_ADC) for Ch4 provided by the monitoring FD 22d is fetched to the ADC 136 (see FIG. 3) of the controller 13 and the digital data converted from the selected monitoring signal by the ADC 136 is stored in the RAM 140 (see FIG. 3) as data for Ch4 (S21). Then, the controller 13 corrects the bias and modulation currents of the LD 21d so that the optical power of the LD 21d of Ch4 approaches the predetermined value according to the selected electrical signal (TxPower_ADC) (S22).

Figure 5:
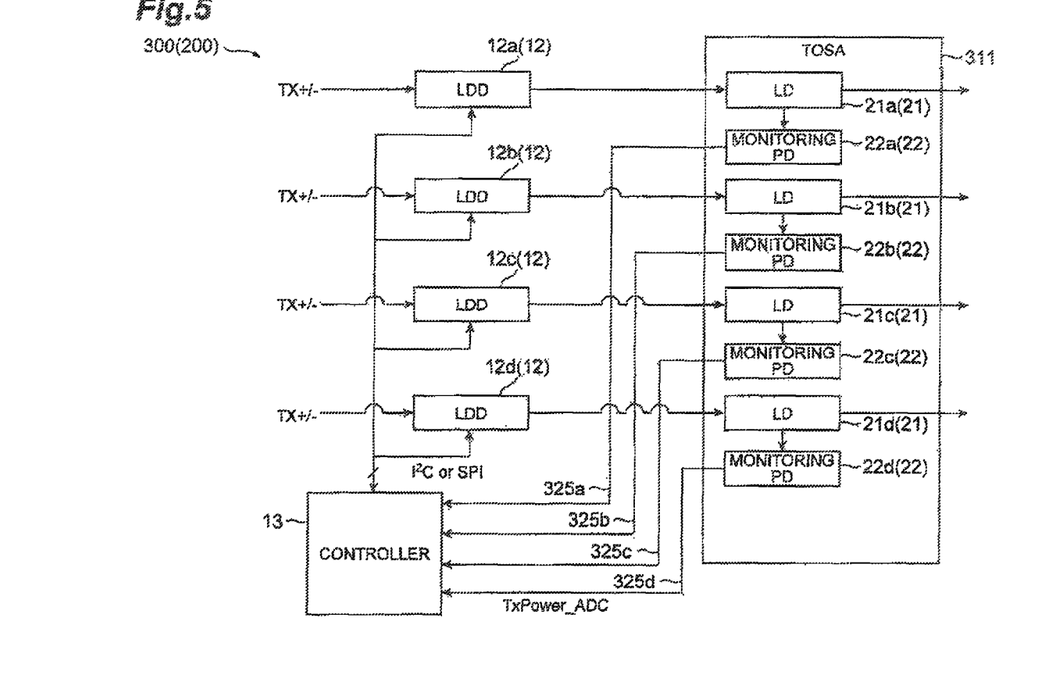
FIG. 5 is a block diagram of an optical transmission unit (optical transmitter) of an optical transceiver relating to a comparative example.

Next, while making a comparison with a comparative example illustrated in FIG. 5, advantages of the optical transmission unit 20 relating to the present embodiment will be described. FIG. 5 is a block diagram of an optical transmission unit 300 of an optical transceiver 200 relating to the comparative example.

The optical transmission unit 300 relating to the comparative example illustrated in FIG. 5 includes, similarly to the optical transmission unit 20 relating to the present embodiment, the four LDs 21 (LDs 21a-21d), the four LDDs 12 (LDDs 12a-12d), the four PDs for monitoring 22 (monitoring PDs 22a-22d), and the controller 13 that controls the LDDs 12 according to the electrical signals provided by the monitoring PDs 22. Here, in the optical transmission unit 300, signal lines 325a-325d extending from each of the monitoring PDs 22a-22d are directly connected to the controller 13. A length of the signal lines 325a-325d depends on respective positions of a TOSA 311 and the controller 13. When both of the TOSA 311 and the controller 13 are arranged at a distance due to restriction or the like in terms of mounting, the length of the signal wiring between them sometimes has to be considerably long. Also, in order to downsize the optical transceiver, it is preferable that an interval between the two adjacent wirings of the signal lines 325a-325d is as narrow as possible so as to reduce an area of the wiring lines connecting electronic components in the inside. However, generally, the longer the length of the signal lines running in parallel is and the narrower the interval between the adjacent signal lines is, the larger the crosstalk occurs. Therefore, in the signal lines 325a-325d in a route from the TOSA 311 to the controller 13, there is a risk that the electrical monitoring signals provided by the monitoring PDs 22a-22d interfere with each other (cause the crosstalk). In this case, some noise occurred in the electrical monitoring signals provided by the monitoring PDs 22a-22d prevents the LDDs 12 to be normally controlled, so that the optical power of the LDs 21 cannot be maintained at an appropriate value.

Therefore, it can be considered to evaluate an effect of the crosstalk to the electrical monitoring signals beforehand and control the LDDs 12 by cancelling the effect of the crosstalk in practice. For example, it can be considered to measure the respective electrical monitoring signals in a state that the optical signals emitted from all of the four LDs 21 beforehand and control the LDDs 12 by taking the effect of the crosstalk into account. However, in the state that the optical signal is not emitted from some LDs 21 for example, when the LDDs 12 are controlled using information measured beforehand (the information in the case that the optical signals emitted from all of the four LDs 21), the optical power of the LDs 21 cannot be tuned to the appropriate value, because the effect of the crosstalk depend on the number of the LDs 21 driven for emitting the optical signals. If the electrical monitoring signals are measured beforehand for all combinations of optical signal states for the four LDs 21 in order to avoid such a situation, prior measuring work to prepare calibration data for cancelling becomes complicated.

On the other hand, in the optical transmission unit 20 relating to the present embodiment, as illustrated in FIG. 2, the signal lines 25a-25d extending from each of the monitoring PDs 22a-22d are electrically connected with the input terminals 27a-27d of the switch unit 27, and the signal line 26 extending from the controller 13 is electrically connected with the output terminal 27x of die switch unit 27. Then, the connection unit 27y of the switch unit 27 electrically connects only one signal line that is selected by the controller 13 from the signal lines 25a-25d to the output terminal 27x. The length of the signal lines 325a-325d in the comparative example sometimes become considerably long (several tens mm, for example) depending on the positions of respective components as described above since they connect two components, and on the other hand, the signal lines 25a-25d relating to the present embodiment can be suppressed to be relatively considerably short (several mm, for example) without receiving such influence since they are housed inside a package of one component (the TOSA 11). Here, the length of the signal line is defined as a length along a route of the wiring of the signal line from one electrical terminal to the other electrical terminal of the electrical terminals respectively provided in the two components connected by the signal line. Therefore, only the electrical monitoring signal of the monitoring PD 22 selected by the controller 13 is provided to the controller 13, and the LDD 12 is controlled so that the optical power of the LD 21 corresponding to the PD 22 selected approaches the predetermined value according to the selected electrical monitoring signal. Then, since the controller 13 select one signal line so as to reduce the influence of the crosstalk (specifically, each of the signal lines is selected one by one so as not to cause the crosstalk among the signal lines 25a-25d), the effect of the crosstalk can be reduced compared to the case that the electrical monitoring signals of all the signal lines are simultaneously provided to the controller 13 in parallel. Also, in the optical transmission unit 20, it is not needed to measure the effect of the crosstalk beforehand. Further, in the optical transmission unit 20, since only one signal line is selected in order from the signal lines 25a-25d, all of the LDDs 12a-12d can be normally controlled. From the above, according to the optical transmission unit 20, the effect of the crosstalk among the electrical monitoring signals can be reduced, and the optical power of the LD 21 can be appropriately and easily maintained at a predetermined value.

While it is needed to provide four output terminals (not shown in the figure) on an output side of the TOSA 311 in the case that the four signal lines 325a-325d extend from the TOSA 311 to the outside of the TOSA 311 as in the optical transmission unit 300 relating to the comparative example, in the optical transmission unit 20, there is only one output terminal 27x of the switch unit 27 housed inside the TOSA 11. Therefore, a size of the TOSA 11 can be made smaller than the TOSA 311, and the optical transmission unit 20 can be suitably downsized.

A preferred embodiment of the present invention has been described above, however, the present invention is not limited to the above-described embodiment. For example, while it has been described that one signal line each is selected from the signal lines, it is not limited thereto as long as it is a selecting method that sufficiently reduces the effect of the crosstalk. A specific example will be described with reference to FIG. 2. In the example illustrated in FIG. 2, the signal line 25b (first signal line) extends from the monitoring PD 22b to the input terminal 27b of the switch, unit 27. Then, the signal line 25a (second signal line) extending from the monitoring PD 22a to the input terminal 27a and the signal line 25c (third signal line) extending from the monitoring PD 22c to the input terminal 27c are arranged respectively holding the signal line 25b therebetween. In this case, the controller 13 may select the signal line 25a (second signal line) and the signal line 25c (third signal line) together as the selected signal lines. By (simultaneously) selecting the two electrical monitoring signals, that is, the signal lines (signal lines 25a and 25c) together in this way, the LDDs 12 (the LDD 12a corresponding to the signal line 25a, and the LDD 12c corresponding to the signal line 25c) can be efficiently controlled in such a time sharing method. Also, when the signal line 25a and the signal line 25c that are the first electrical wiring lines corresponding to the selected electrical monitoring signals are arranged holding the signal line 25b (the first electrical wiring line corresponding to the unselected electrical monitoring signal) therebetween, since the signal line 25b serves a function of a shield, the crosstalk of the electrical monitoring signals of the signal line 25a and the signal line 25c can be suppressed. That is, in the case of simultaneously selecting at least two electrical monitoring signals, the controller 13 generates the selection signal so that the first electrical wiring line corresponding to at least one unselected electrical monitoring signal is arranged between the respective first electrical wiring lines corresponding to the selected electrical monitoring signals. In the case of simultaneously selecting two signal lines in this way, for example, a 4-to-2 type analog switch including two output terminals is used for the switch unit 27, two signal lines 26 are provided, and one select signal line 28 is provided just to switch two of the combination of the signal lines 25a and 25c and the combination of the signal lines 25b and 25d. Also, in the case that there are not just four signal lines 25a-25d but more, eight lines for sample, by selecting the signal lines so that at least one unselected signal line is arranged between the selected signal lines, the crosstalk among the signal lines can be reduced by the similar principle.

Also, it has been described that the four LDDs 12 in the configuration of the optical transmission unit 20 are arranged outside the TOSA 11, however, the four LDDs may be arranged inside the TOSA. Also, the number of the LDs, the monitoring PDs, and the LDDs is not limited to four, and may be three or smaller or be five or larger.

What is claimed is:
1. An optical transmitter comprising:
at least two laser diodes (LDs) configured to generate respective optical signals in response to respective driving signals;
driving circuits configured to generate the respective driving signals;
photo detectors (PDs) configured to convert the respective optical signals to respective first electrical signals and output the respective first electrical signals;
a switch configured to select one first electrical signal of the respective first electrical signals according to a selection signal and configured to output the one first electrical signal as a second electrical signal, the switch providing first input terminals and a first output terminal, the first input terminals being configured to receive the respective first electrical signals one-to-one, the switch electrically connecting one of the first input terminals to the first output terminal and thereby outputting the second electrical signal; and
a controller configured to generate the selection signal and control one of the driving circuits in response to the second electrical signal so as to maintain an intensity of one optical signal of the respective optical signals at a predetermined value, the one optical signal being generated by one of the LDs that is driven by the one of the driving circuits,
wherein the controller generates the selection signal, so that the switch connects each of the first input terminals to the first output terminal one by one at a time interval,
wherein the PDs provide respective second output terminals configured to output the respective first electrical signals,
wherein the controller includes a second input terminal configured to receive the second electrical signal from the switch, and
wherein the optical transmitter further includes first wirings that electrically connect the respective second output terminals to the first input terminals one-to-one and a second wiring that electrically connects the first output terminal to the second input terminal, the first wirings having respective lengths between the respective second output terminals and the first input terminals, each of the lengths being shorter than a length of the second wiring between the first output terminal and the second input terminal.

2. The optical transmitter according to claim 1,
wherein the switch selects the respective first electrical signals one by one at a predetermined time interval.

3. The optical transmitter according to claim 1,
wherein the optical transmitter further includes a package configured to house the at least two LDs, PDs, the switch, and the first wirings so as to from an optical component.

4. The optical transmitter according to claim 3,
wherein the second wiring is configured to transmit the second electrical signal from the optical component to the controller.

5. An optical transmitter comprising:
at least four laser diodes (LDs) configured to generate respective optical signals in response to respective driving signals;
driving circuits configured to generate the respective driving signals;
photo detectors (PDs) configured to convert the respective optical signals to respective first electrical signals and output the respective first electrical signals;
a switch configured to select at least two of the respective first electrical signals according to a selection signal, and configured to output the at least two of the respective first electrical signals as second electrical signals, the switch providing first input terminals and a first output terminal, the first input terminals being configured to receive the respective first electrical signals one-to-one, the switch electrically connecting the first input terminals to the first output terminal and thereby outputting the second electrical signals; and
a controller configured to generate the selection signal and control at least two of the driving circuits in response to the second electrical signals so as to maintain an intensity of at least two of the respective optical signals at a predetermined value, the at least two of the respective optical signals being generated by at least two of the at least four LDs that are driven by the at least two of the driving circuits,
wherein the controller generates the selection signal, so that the switch connects each of the first input terminals to the first output terminal one by one at a time interval,
wherein the PDs provide respective second output terminals configured to output the respective first electrical signals,
wherein the controller includes a second input terminal configured to receive the second electrical signals from the switch, and
wherein the optical transmitter further includes first wirings that electrically connect the respective second output terminals to the first input terminals one-to-one and a second wiring that electrically connects the first output terminal to the second input terminal, the first wirings having respective lengths between the respective second output terminals and the first input terminals, each of the lengths being shorter than a length of the second wiring between the first output terminal and the second input terminal.

6. The optical transmitter according to claim 5, wherein the controller generates the selection signal, so that two of the first wirings corresponding to two of first electrical signals selected according to the selection signal have an unselected first wiring therebetween.

* * * * *